US011346005B2

(12) United States Patent
Takebayashi et al.

(10) Patent No.: US 11,346,005 B2
(45) **Date of Patent: *May 31, 2022**

(54) GRAIN-ORIENTED ELECTRICAL STEEL SHEET

(71) Applicant: NIPPON STEEL CORPORATION, Tokyo (JP)

(72) Inventors: Seiki Takebayashi, Tokyo (JP); Shuichi Nakamura, Tokyo (JP); Hiroyasu Fujii, Tokyo (JP); Yoshiyuki Ushigami, Tokyo (JP); Shinsuke Takatani, Tokyo (JP)

(73) Assignee: NIPPON STEEL CORPORATION, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 16/626,207

(22) PCT Filed: Jul. 13, 2018

(86) PCT No.: PCT/JP2018/026622

§ 371 (c)(1),
(2) Date: Dec. 23, 2019

(87) PCT Pub. No.: WO2019/013353

PCT Pub. Date: Jan. 17, 2019

(65) Prior Publication Data

US 2020/0123662 A1 Apr. 23, 2020

(30) Foreign Application Priority Data

Jul. 13, 2017 (JP) ............................ JP2017-137416

(51) Int. Cl.
*B32B 9/00* (2006.01)
*C23C 28/04* (2006.01)
(Continued)

(52) U.S. Cl.
CPC .............. *C23C 28/04* (2013.01); *C21D 6/008* (2013.01); *C21D 8/1222* (2013.01);
(Continued)

(58) Field of Classification Search
None
See application file for complete search history.

(56) References Cited

U.S. PATENT DOCUMENTS 6,214,473 B1 * 4/2001 Hunt .................... C23C 16/402 428/469
2009/0233114 A1 9/2009 Takeda et al.
(Continued)

FOREIGN PATENT DOCUMENTS

GB 2 153 520 A 8/1985
JP 49-96920 A 9/1974
(Continued)

OTHER PUBLICATIONS

International Search Report for PCT/JP2018/026622 (PCT/ISA/210) dated Sep. 18, 2018.
(Continued)

*Primary Examiner* — Seth Dumbris
*Assistant Examiner* — Kim S. Horger
(74) *Attorney, Agent, or Firm* — Birch, Stewart, Kolasch & Birch, LLP

(57) ABSTRACT

A grain-oriented electrical steel sheet includes: a base steel sheet; an intermediate layer arranged in contact with the base steel sheet; and an insulation coating arranged in contact with the intermediate layer to be an outermost surface, in which the insulation coating has a crystalline phosphide-containing layer containing a crystalline phosphide in an area in contact with the intermediate layer when viewing a cross section whose cutting direction is parallel to a thickness direction.

9 Claims, 1 Drawing Sheet

(51) Int. Cl.

| | |
|---|---|
| ***C21D 6/00*** | (2006.01) |
| ***C21D 8/12*** | (2006.01) |
| ***C21D 9/46*** | (2006.01) |
| ***C22C 38/00*** | (2006.01) |
| ***C22C 38/02*** | (2006.01) |
| ***C22C 38/04*** | (2006.01) |
| ***C22C 38/06*** | (2006.01) |
| ***C23C 8/10*** | (2006.01) |
| ***C23C 8/26*** | (2006.01) |
| ***C23F 17/00*** | (2006.01) |
| ***H01F 1/147*** | (2006.01) |

(52) U.S. Cl.

CPC ......... *C21D 8/1233* (2013.01); *C21D 8/1255* (2013.01); *C21D 8/1261* (2013.01); *C21D 8/1283* (2013.01); *C21D 9/46* (2013.01); *C22C 38/001* (2013.01); *C22C 38/002* (2013.01); *C22C 38/02* (2013.01); *C22C 38/04* (2013.01); *C22C 38/06* (2013.01); *C23C 8/10* (2013.01); *C23C 8/26* (2013.01); *C23F 17/00* (2013.01); *H01F 1/147* (2013.01)

(56) References Cited

U.S. PATENT DOCUMENTS

| | | | |
|---|---|---|---|
| 2014/0377573 A1 | 12/2014 | Okubo et al. | |
| 2020/0056256 A1* | 2/2020 | Takajo | C21D 8/1283 |

FOREIGN PATENT DOCUMENTS

| | | | |
|---|---|---|---|
| JP | 3-130376 A | 6/1991 | |
| JP | 5-279747 A | 10/1993 | |
| JP | 5-279864 A | 10/1993 | |
| JP | 6-184762 A | 7/1994 | |
| JP | 7-278833 A | 10/1995 | |
| JP | 8-191010 A | 7/1996 | |
| JP | 9-78252 A | 3/1997 | |
| JP | 11-209891 A | 8/1999 | |
| JP | 2001-220683 A | 8/2001 | |
| JP | 2002-322566 A | 11/2002 | |
| JP | 2002-348643 A | 12/2002 | |
| JP | 2002-363763 A | 12/2002 | |
| JP | 2003-171773 A | 6/2003 | |
| JP | 2003-193251 A | 7/2003 | |
| JP | 2003-193252 A | 7/2003 | |
| JP | 2003-313644 A | 11/2003 | |
| JP | 2004-315880 A | 11/2004 | |
| JP | 2004-342679 A | 12/2004 | |
| JP | 2007-217758 A | 8/2007 | |
| JP | 4184809 B2 | 11/2008 | |
| RU | 2407818 C2 | 12/2010 | |
| WO | WO 2013/099455 A1 | 7/2013 | |

OTHER PUBLICATIONS

Written Opinion of the International Searching Authority for PCT/JP2018/026622 (PCT/ISA/237) dated Sep. 18, 2018.

Russian Notice of Allowance and Search Report, dated May 14, 2020, for counterpart Russian Application No. 2020102030/05, along with an English translation.

International Search Report (PCT/ISA/210) for International Application No. PCT/JP2018/026620, dated Sep. 18, 2018.

U.S. Office Action for U.S. Appl. No. 16/628,930, dated Mar. 10, 2021.

Written Opinion of the International Searching Authority (PCT/ISA/237) for International Application No. PCT/JP2018/026620, dated Sep. 18, 2018.

* cited by examiner

GRAIN-ORIENTED ELECTRICAL STEEL SHEET

TECHNICAL FIELD OF THE INVENTION

The present invention relates to a grain-oriented electrical steel sheet excellent in coating adhesion. In particular, the present invention relates to a grain-oriented electrical steel sheet excellent in the coating adhesion of insulation coating even without a forsterite film.

Priority is claimed on Japanese Patent Application No. 2017-137416, filed on Jul. 13, 2017, and the content of which is incorporated herein by reference.

RELATED ART

A grain-oriented electrical steel sheet is a soft magnetic material, is mainly used as a core material of a transformer, and is thus required to have magnetic characteristics such as high magnetization characteristics and low iron loss. The magnetization characteristics relate to the magnetic flux density induced when a core is excited. As the magnetic flux density increases, the core can be reduced in size. Thus, it is advantageous for the device configuration of the transformer, and also advantageous for the cost of manufacturing the transformer.

In order to increase the magnetization characteristics, it is necessary to control the texture to the crystal orientation (Goss orientation) in which the {110} plane is aligned parallel to the steel sheet surface and the <100> axis is aligned with the rolling direction. In order to align the crystal orientation with the Goss orientation, in general, the inhibitors such as AlN, MnS, and MnSe are finely precipitated in steel, and thereby, the secondary recrystallization is controlled.

The iron loss is a power loss consumed as heat energy when the core is excited by an alternating-current magnetic field. The iron loss is required to be as low as possible from the viewpoint of energy saving. The level of iron loss is influenced by magnetic susceptibility, sheet thickness, coating tension, the amount of impurities, electrical resistivity, grain size, magnetic domain size, and the like. Even at the present time with various technologies developed for electrical steel sheets, research and development for reducing iron losses are continuously performed to improve energy efficiency.

Another characteristic required for the grain-oriented electrical steel sheet is a characteristic of a film and a coating formed on the surface of the base steel sheet. In general, in a grain-oriented electrical steel sheet, as shown in FIG. 1, a forsterite film 2 mainly containing $Mg_2SiO_4$ (forsterite) is formed on the base steel sheet 1, and an insulation coating 3 is formed on the forsterite film 2. The forsterite film and the insulation coating electrically insulate the surface of the base steel sheet, and have a function of applying tension to the base steel sheet to reduce the iron loss. The forsterite film contains, in addition to $Mg_2SiO_4$, a small amount of impurities and additives derived from the base steel sheet and an annealing separator, and reaction products thereof.

In order for the insulation coating to exhibit insulation properties and required tension, the insulation coating must not delaminate from the electrical steel sheet, and therefore, the insulation coating is required to have high coating adhesion. However, it is not easy to simultaneously increase both the tension applied to the base steel sheet and the coating adhesion. Even at the present time, research and development to simultaneously increase both properties are continuously carried out.

The grain-oriented electrical steel sheet is typically manufactured by the following procedure. A silicon steel slab containing 2.0 to 4.0 mass % of Si is hot-rolled, annealed as necessary after the hot rolling, cold-rolled once or cold-rolled two times or more times with intermediate annealing therebetween, whereby the a steel sheet having a final thickness is obtained. Thereafter, the steel sheet having the final thickness is decarburized in a wet hydrogen atmosphere, whereby the primary recrystallization is proceeded in addition to decarburization and an oxide layer is formed on the surface of the steel sheet.

An annealing separator containing MgO (magnesia) as a main component is applied to the steel sheet having the oxide layer. After drying the annealing separator, the steel sheet is wound into a coil. Subsequently, the coiled steel sheet is final-annealed, whereby the secondary recrystallization is promoted and the grains are aligned with the Goss orientation. In addition, the MgO in the annealing separator is reacted with the $SiO_2$ (silica) in the oxide layer, whereby an inorganic forsterite film mainly containing $Mg_2SiO_4$ is formed on the surface of the base steel sheet.

The steel sheet having the forsterite film is purifying-annealed, whereby the impurities in the base steel sheet are diffused to the outside and removed. Subsequently, after the steel sheet is flattening-annealed, a solution mainly containing a phosphate and colloidal silica is applied onto the surface of the steel sheet having the forsterite film, and then, the steel sheet is baked, whereby an insulation coating is formed. At the time, tension is imparted between the base steel sheet which is crystalline and the insulation coating which is substantially amorphous due to the difference in thermal expansion coefficient therebetween.

The interface between the forsterite film ("2" in FIG. 1) mainly containing $Mg_2SiO_4$ and the steel sheet ("1" in FIG. 1) typically has an uneven shape which is not uniform (see FIG. 1). The uneven shape of the interface slightly deteriorates the iron loss reduction effect due to tension. Since the iron loss is reduced when the interface is smoothed, the following developments have been carried out up to the present.

Patent Document 1 discloses a manufacturing method in which a forsterite film is removed by pickling or the like, and the surface of a steel sheet is smoothened by chemical polishing or electrolytic polishing. However, in the manufacturing method of Patent Document 1, there are cases where an insulation coating is difficult to adhere to the surface of a base steel sheet.

Therefore, in order to increase the coating adhesion of the insulation coating to the steel sheet with smooth surface, as shown in FIG. 2, forming an intermediate layer 4 (or base coating) between the base steel sheet and the insulation coating is suggested. A base coating formed by applying an aqueous solution of a phosphate or an alkali metal silicate disclosed in Patent Document 2 is also effective for coating adhesion. As a more effective method, Patent Document 3 discloses a method of annealing a steel sheet in a specific atmosphere before forming an insulation coating to form an externally oxidized silica layer as an intermediate layer on the surface of the steel sheet.

Furthermore, Patent Document 4 discloses a method of forming 100 $mg/m^2$ or less of an externally oxidized silica layer as an intermediate layer on the surface of a base steel sheet before forming an insulation coating. Patent Document 5 discloses a method of forming an externally oxidized amorphous layer such as a silica layer as an intermediate layer in a case where an insulation coating is a crystalline insulation coating mainly containing a boric acid compound and alumina sol.

These externally oxidized silica layers are formed as an intermediate layer on the surface of the base steel sheet, function as a base material of the smooth interface, and exhibits a certain effect in improving the coating adhesion of the insulation coating. However, further development is under way to more reliably secure the adhesion of the insulation coating formed on the externally oxidized silica layer.

Patent Document 6 discloses a method of performing a heat treatment on a base steel sheet having a smooth surface in an oxidizing atmosphere to form a crystalline intermediate layer of $Fe_2SiO_4$ (fayalite) or $(Fe,Mn)_2SiO_4$ (knebelite) on the surface of the steel sheet, and thereafter forming an insulation coating thereon.

However, in the oxidizing atmosphere in which $Fe_2SiO_4$ or $(Fe,Mn)_2SiO_4$ is formed on the surface of the base steel sheet, Si in the surface layer of the base steel sheet is oxidized and an oxide such as $SiO_2$ is precipitated, so that there are cases where iron loss characteristics deteriorate.

$Fe_2SiO_4$ and $(Fe,Mn)_2SiO_4$ in the intermediate layer are crystalline, while the insulation coating formed of a solution mainly containing a phosphate and colloidal silica is mostly amorphous. There are cases where the adhesion between the intermediate layer which is crystalline and the insulation coating which is substantially amorphous is not stable.

Furthermore, there are cases where the tension applied to the surface of the steel sheet by the intermediate layer mainly containing $Fe_2SiO_4$ or $(Fe,Mn)_2SiO_4$ is not as large as the tension applied to the surface of the steel sheet by the intermediate layer mainly containing $SiO_2$.

Patent Document 7 discloses a method of forming a gel coating having a thickness of 0.1 to 0.5 μm as an intermediate layer on the smooth surface of a base steel sheet by a sol-gel method, and forming an insulation coating on the intermediate layer.

However, the coating conditions disclosed in Patent Document 7 are within the range of a typical sol-gel method, and there are cases where coating adhesion cannot be firmly secured.

Patent Document 8 discloses a method of forming a siliceous coating as an intermediate layer on the smooth surface of a base steel sheet by an anodic electrolytic treatment in an aqueous solution of silicate and thereafter forming an insulation coating. Patent Document 9 discloses an electrical steel sheet in which an oxide such as $TiO_2$ (an oxide of one or more selected from Al, Si, Ti, Cr, and Y) is included in the form of layers or islands on the smooth surface of a base steel sheet, a silica layer is included thereon, and an insulation coating is further included thereon.

By forming such an intermediate layer, it is possible to improve the coating adhesion. However, since large facilities such as an electrolytic treatment facility or a dry coating facility are newly required, there are cases where it is difficult to secure the installation site, and the manufacturing costs increase.

Patent Document 10 discloses a method of forming, on the smooth surface of a base steel sheet, an externally oxidized layer as an intermediate layer, which has a thickness of 2 to 500 nm, contains metal iron in a cross-sectional area fraction of 30% or less, and mainly contains $SiO_2$, and forming an insulation coating on the intermediate layer.

Patent Document 11 discloses a method of forming, on the smooth surface of a base steel sheet, an intermediate layer which has a thickness of 0.005 to 1 μm, contains metal iron or an iron-containing oxide in a volume fraction of 1% to 70%, and mainly contains a vitreous silicon oxide, and forming an insulation coating on the intermediate layer.

Patent Document 12 discloses a method of forming, on the smooth surface of a base steel sheet, an externally oxidized layer as an intermediate layer, which has a thickness of 2 to 500 nm, contains a metal oxide (Si—Mn—Cr oxide, Si—Mn—Cr—Al—Ti oxide, or Fe oxide) in a cross-sectional area fraction of 50% or less, and mainly contains $SiO_2$ as an intermediate layer, and forming an insulation coating on the intermediate layer.

As described above, when the intermediate layer mainly containing $SiO_2$ contains metal iron, iron-containing oxides, or metal oxides, the coating adhesion of the insulation coating is improved to some extent, but industrially, further improvement is expected.

On the other hand, Patent Documents 13 to 15 disclose techniques for, in a case of forming an insulation coating containing an acidic organic resin substantially free of chromium as a main component on a steel sheet, improving the external appearance and adhesion of the insulation coating by forming a phosphorus compound layer ($FePO_4$, $Fe_3(PO_4)_2$, $FeHPO_4$, $Fe(H_2PO_4)_2$, $Zn_2Fe(PO_4)_2$, $Zn_3(PO_4)_2$, or a layer made of a hydrates thereof, or a layer made of a phosphate of Mg, Ca, and Al, with a thickness of 10 to 200 nm). However, in these above-described techniques, there are cases where the insulation coating locally delaminates.

PRIOR ART DOCUMENT

Patent Document

[Patent Document 1] Japanese Unexamined Patent Application, First Publication No. S49-096920
[Patent Document 2] Japanese Unexamined Patent Application, First Publication No. H05-279747
[Patent Document 3] Japanese Unexamined Patent Application, First Publication No. H06-184762
[Patent Document 4] Japanese Unexamined Patent Application, First Publication No. H09-078252
[Patent Document 5] Japanese Unexamined Patent Application, First Publication No. H07-278833
[Patent Document 6] Japanese Unexamined Patent Application, First Publication No. H08-191010
[Patent Document 7] Japanese Unexamined Patent Application, First Publication No. H03-130376
[Patent Document 8] Japanese Unexamined Patent Application, First Publication No. H11-209891
[Patent Document 9] Japanese Unexamined Patent Application, First Publication No. 2004-315880
[Patent Document 10] Japanese Unexamined Patent Application, First Publication No. 2003-313644
[Patent Document 11] Japanese Unexamined Patent Application, First Publication No. 2003-171773
[Patent Document 12] Japanese Unexamined Patent Application, First Publication No. 2002-348643
[Patent Document 13] Japanese Unexamined Patent Application, First Publication No. 2001-220683
[Patent Document 14] Japanese Unexamined Patent Application, First Publication No. 2003-193251
[Patent Document 15] Japanese Unexamined Patent Application, First Publication No. 2003-193252

DISCLOSURE OF THE INVENTION

Problems to be Solved by the Invention

Typically, the layering structure of a grain-oriented electrical steel sheet having no forsterite film has a three-layer structure of "base steel sheet-intermediate layer mainly containing silicon oxide-insulation coating", and the structure between the base steel sheet and the insulation coating is macroscopically uniform and smooth (see FIG. 2). However, even in the case of the insulation coating excellent in coating adhesion in the related art, the insulation coating locally delaminates.

It is presumed that this is because, in the layering structure of the above three-layer structure, there are locally thin portions in the intermediate layer mainly containing silicon oxide (hereinafter, may be simply referred to as "intermediate layer"), and at these portions, the coating adhesion is reduced and the insulation coating delaminates. Such a local reduction in coating adhesion affects the tension applied to the base steel sheet, and therefore also affects the iron loss.

Therefore, an object of the present invention is to form an insulation coating on the entire surface of an intermediate layer mainly containing silicon oxide so as not to cause uneven adhesion to the intermediate layer, and to increase overall coating adhesion of the insulation coating to an electrical steel sheet. That is, an object of the present invention is to provide a grain-oriented electrical steel sheet excellent in the coating adhesion of insulation coating even without a forsterite film.

Means for Solving the Problem

In the related art, in order to control the coating adhesion of insulation coating to be uniform, an intermediate layer mainly containing silicon oxide is formed on the surface of a base steel sheet finished smooth more uniformly and smoothly. However, in practice, as described above, the coating adhesion of the insulation coating formed by applying and baking a solution mainly containing a phosphate and colloidal silica is uneven, and the insulation coating locally delaminates.

The present inventors intensively studied methods for solving the above problems regardless of technical common sense.

As a result, it was found that when a crystalline phosphide-containing layer containing a crystalline phosphide is formed in a lower area of an insulation coating in contact with an intermediate layer mainly containing silicon oxide, unevenness of the coating adhesion of the insulation coating can be suppressed, and as a result, the coating adhesion of the insulation coating to an electrical steel sheet can be increased while properly maintaining the insulation properties of the insulation coating.

An aspect of the present invention employs the following.

(1) A grain-oriented electrical steel sheet according to an aspect of the present invention includes: a base steel sheet; an intermediate layer arranged in contact with the base steel sheet; and an insulation coating arranged in contact with the intermediate layer to be an outermost surface, in which the insulation coating has a crystalline phosphide-containing layer containing a crystalline phosphide in an area in contact with the intermediate layer when viewing a cross section whose cutting direction is parallel to a thickness direction.

(2) In the grain-oriented electrical steel sheet according to (1), an average thickness of the crystalline phosphide-containing layer may be 1/10 or more and 1/2 or less of an average thickness of the insulation coating when viewing the cross section.

(3) In the grain-oriented electrical steel sheet according to (1) or (2), an area fraction of the crystalline phosphide in the crystalline phosphide-containing layer may be 5% to 50% on average when viewing the cross section.

(4) In the grain-oriented electrical steel sheet according to any one of (1) to (3), an equivalent circle diameter of the crystalline phosphide may be 5 to 300 nm on average when viewing the cross section.

(5) In the grain-oriented electrical steel sheet according to any one of (1) to (4), the crystalline phosphide may contain 70 at % or more and 100 at % or less in total of Fe, Cr, P, and O, and limit Si to 10 at % or less, as a chemical composition.

(6) In the grain-oriented electrical steel sheet according to any one of (1) to (5), at least one selected from the group consisting of FeP, $Fe_2P$, $Fe_3P$, $FeP_2$, and $Fe_2P_2O_7$ may be contained as the crystalline phosphide.

(7) In the grain-oriented electrical steel sheet according to any one of (1) to (6), at least one selected from the group consisting of (Fe,Cr)P, $(Fe,Cr)_2P$, $(Fe,Cr)_3P$, $(Fe,Cr)P_2$, and $(Fe,Cr)_2P_2O_7$ may be contained as the crystalline phosphide.

Effects of the Invention

According to the above aspect of the present invention, it is possible to provide a grain-oriented electrical steel sheet provided with an insulation coating having no unevenness in coating adhesion, that is, a grain-oriented electrical steel sheet excellent in the coating adhesion of insulation coating even without a forsterite film.

EMBODIMENTS OF THE INVENTION

Hereinafter, a preferable embodiment of the present invention will be described in detail. However, the present invention is not limited only to the configuration which is disclosed in the embodiment, and various modifications are possible without departing from the aspect of the present invention. In addition, the limitation range as described below includes a lower limit and an upper limit thereof. However, the value expressed by "more than" or "less than" is not include in the limitation range.

A grain-oriented electrical steel sheet excellent in coating adhesion according to the present embodiment (hereinafter, sometimes referred to as the "electrical steel sheet of the present invention") is a grain-oriented electrical steel sheet in which there is no forsterite film on the surface of a base steel sheet, an intermediate layer mainly containing silicon oxide is arranged on the surface of the base steel sheet, an insulation coating formed mainly containing a phosphate and colloidal silica is arranged on the intermediate layer, and a crystalline phosphide-containing layer containing a crystalline phosphide is arranged in a lower area of the insulation coating in contact with the intermediate layer.

Specifically, the grain-oriented electrical steel sheet of the present embodiment is a grain-oriented electrical steel sheet including a base steel sheet, an intermediate layer arranged in contact with the base steel sheet, and an insulation coating arranged in contact with the intermediate layer to be the outermost surface, and the insulation coating includes a crystalline phosphide-containing layer containing a crystalline phosphide in an area in contact with the intermediate layer when viewing a cross section (specifically, a cross section parallel to a thickness direction and perpendicular to a rolling direction) whose cutting direction is parallel to the thickness direction.

Here, the grain-oriented electrical steel sheet having no forsterite film is a grain-oriented electrical steel sheet manufactured by removing a formed forsterite film, or a grain-oriented electrical steel sheet manufactured by suppressing the formation of a forsterite film.

Hereinafter, the electrical steel sheet of the present invention will be described.

Figure 1:
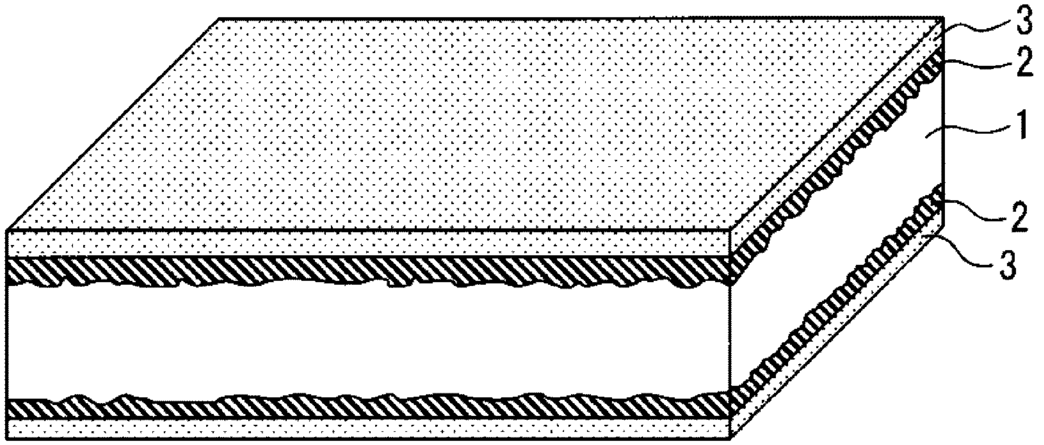
FIG. 1 is a cross-sectional schema showing a layering structure of a grain-oriented electrical steel sheet in the related art.
Figure 2:
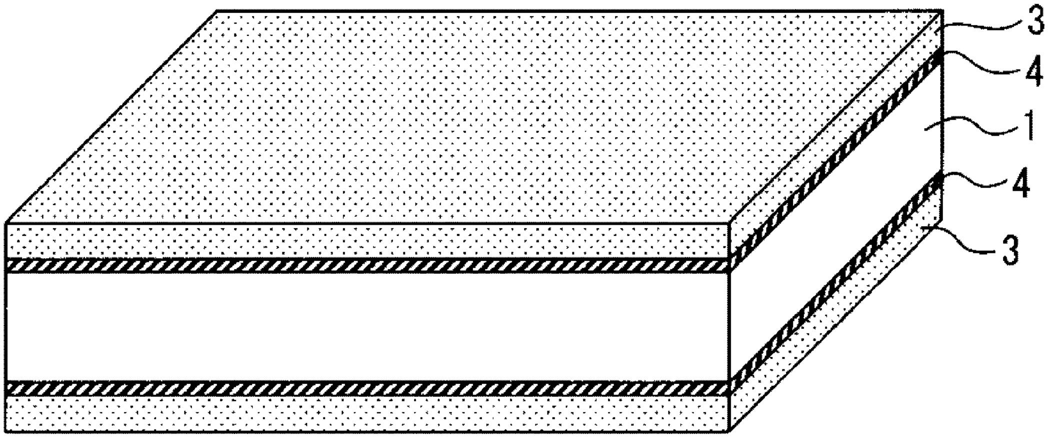
FIG. 2 is a cross-sectional schema showing another layering structure of a grain-oriented electrical steel sheet in the related art.

In the related art, an intermediate layer mainly containing silicon oxide is formed on the surface of a base steel sheet by performing annealing (thermal oxidation treatment) or the like on the base steel sheet having no forsterite film in an atmosphere with controlled dew point, and an insulation coating is formed by applying an insulation coating forming solution onto the intermediate layer and performing baking annealing thereon. The cross-sectional structure of the electrical steel sheet in the related art is a three-layer structure of "insulation coating-intermediate layer-base steel sheet" as shown in FIG. 2. After a heat treatment, surface tension acts between the layers due to the difference in thermal expansion coefficient between the layers, so that tension can be applied to the base steel sheet, while the layers become to be easily separated.

Therefore, the present inventors paid attention to interlayer of "insulation coating-intermediate layer", thought that addition of another special layer between the layers can increase the adhesion between the layers while maintaining tension applied to the base steel sheet, and examined layers that can be added as follows.

As the layers that can be added, a layer having a component compatible with both the insulation coating and the base steel sheet was examined. That is, it was investigated to have the same main component as that of the insulation coating and to include a compound mainly containing P, O, and/or Fe mixed therein. In addition, Cr which has similar properties to Fe was included, and mixing a compound containing P, O, Fe, and Cr therein was examined.

For example, as the compound to be mixed, a compound containing Fe, Cr, P, and O in a total amount of 70 at % or more and 100 at % or less, and limiting Si to 10 at % or less, as a chemical composition, was examined.

Specifically, as the compound to be mixed, a crystalline phosphide such as $Fe_3P$, $Fe_2P$, FeP, $FeP_2$, and $Fe_2P_2O_7$ was examined. Furthermore, a crystalline phosphide such as $(Fe,Cr)_3P$, $(Fe,Cr)_2P$, (Fe,Cr)P, $(Fe,Cr)P_2$, and $(Fe,Cr)_2P_2O_7$, which is a compound that also contains Cr having similar properties to Fe and substituting a portion of Fe was examined.

Based on the above examination results, a solution was prepared by mixing the above-mentioned crystalline phosphide in an application solution mainly containing a phosphate and colloidal silica for forming the insulation coating. This solution was used as a crystalline phosphide-containing layer forming solution.

The intermediate layer mainly containing silicon oxide was formed on the surface of the base steel sheet by performing thermal oxidation treatment (annealing in an atmosphere with controlled dew point) or the like on the base steel sheet having no forsterite film. The crystalline phosphide-containing layer forming solution was applied onto the intermediate layer and baked, and thereafter, the insulation coating forming solution was further applied and baked, whereby the insulation coating was formed. The coating adhesion of the electrical steel sheet manufactured as above was evaluated.

As a result of the above examination, it was clarified that when the crystalline phosphide-containing layer, in which crystalline phosphide is concentrated, is formed in the lower area of the insulation coating in contact with the intermediate layer mainly containing silicon oxide, the coating adhesion of the insulation coating is significantly improved.

Figure 3:
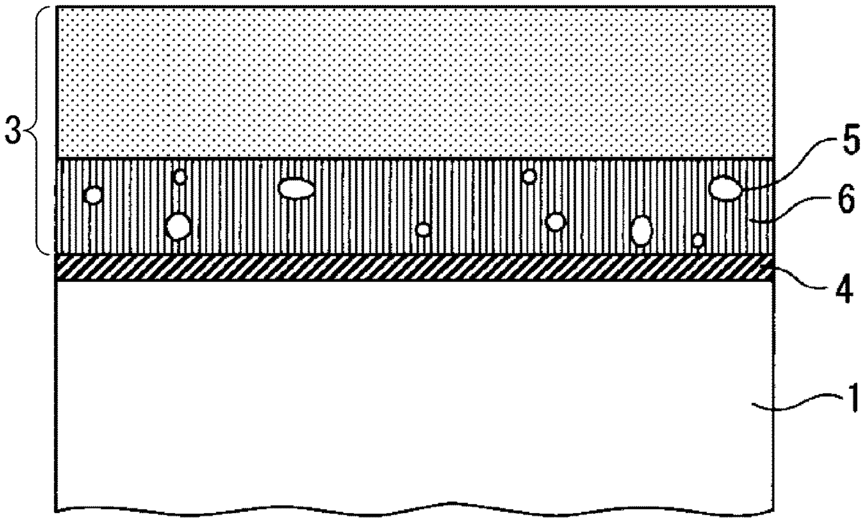
FIG. 3 is a cross-sectional schema showing a layering structure of a grain-oriented electrical steel sheet according to an embodiment of the present invention.

The layering structure of the electrical steel sheet of the present invention is schematically shown in FIG. 3. As shown in FIG. 3, the cross-sectional structure of the electrical steel sheet of the present invention has a four-layer structure of "base steel sheet 1-intermediate layer 4-crystalline phosphide-containing layer 6 containing crystalline phosphide 5-insulation coating 3".

That is, since the crystalline phosphide-containing layer is formed in the lower area of the insulation coating in contact with the intermediate layer mainly containing silicon oxide, the cross-sectional structure has substantially a four-layer structure.

Strictly speaking, the crystalline phosphide-containing layer 6 and the insulation coating 3 are different from each other. However, since the component of the matrix of the crystalline phosphide-containing layer 6 is the same as the component of the insulation coating 3, the crystalline phosphide-containing layer 6 and the insulation coating 3 are similar to each other. The crystalline phosphide-containing layer 6 and the insulation coating 3 are different from each other in whether or not the crystalline phosphide 5 is contained.

Hereinafter, each layer of the electrical steel sheet of the present invention will be described.

Base Steel Sheet

In the above-described four-layer structure, the base steel sheet as the base material has a texture in which the crystal orientation is controlled to the Goss orientation. The surface roughness of the base steel sheet is not particularly limited, but is preferably 0.5 μm or less and more preferably 0.3 μm or less in terms of arithmetic average roughness (Ra) from the viewpoint of achieving a reduction in iron loss by applying a large tension to the base steel. The lower limit of the arithmetic average roughness (Ra) of the base steel sheet is not particularly limited. However, the effect of improving the iron loss is saturated at 0.1 μm or less, so that the lower limit thereof may be 0.1 μm.

The thickness of the base steel sheet is also not particularly limited. However, in order to further reduce the iron loss, the thickness is preferably 0.35 mm or less, and more preferably 0.30 mm or less on average. The lower limit of the thickness of the base steel sheet is not particularly limited, but may be 0.10 mm from the viewpoint of manufacturing facilities and costs.

The base steel sheet contains a high concentration of Si (for example, 0.80 to 4.00 mass %), so that a strong chemical affinity with the intermediate layer mainly containing silicon oxide is developed, and the intermediate layer and the base steel sheet firmly adhere to each other.

Intermediate Layer Mainly Containing Silicon Oxide

In the four-layer structure mentioned above, the intermediate layer is arranged in contact with the base steel sheet, and has a function of bringing the base steel sheet and the insulation coating containing the crystalline phosphide-containing layer into close contact.

The silicon oxide mainly contained in the intermediate layer is preferably $SiO_x$ (x=1.0 to 2.0). $SiO_x$ (x=1.5 to 2.0) is more preferable because silicon oxide becomes more stable. $SiO_x$ (x≈2.0) can be formed by sufficiently performing oxidation annealing when silicon oxide is formed on the surface of the base steel sheet.

When the oxidation annealing is performed under typical conditions (atmosphere gas: 20% to 80% $N_2$+80% to 20% $H_2$, dew point: −20° C. to 2° C., annealing temperature: 600° C. to 1150° C., annealing time: 10 to 600 seconds), silicon oxide remains amorphous, so that an intermediate layer of a dense material which has high strength to withstand thermal stress and can easily relax thermal stress due to increased elasticity can be formed on the surface of the base steel sheet.

On the other hand, when the thickness of the intermediate layer is thin, the thermal stress relaxation effect is not sufficiently exhibited, and therefore, the thickness of the intermediate layer is preferably 2 nm or more on average. The thickness thereof is more preferably 5 nm or more. On the other hand, when the thickness of the intermediate layer is large, the thickness becomes uneven, and defects such as voids and cracks are generated in the layer. Therefore, the thickness of the intermediate layer is preferably 400 nm or less on average. The thickness thereof is more preferably 300 nm or less.

Insulation Coating

In the above-mentioned four-layer structure, the insulation coating is a vitreous insulation coating which is located at the outermost surface and formed by applying and baking a solution mainly containing a phosphate and colloidal silica ($SiO_2$).

This insulation coating can apply high surface tension to the base steel sheet. However, since the insulation coating of the electrical steel sheet of the present invention includes the crystalline phosphide-containing layer (described later) containing a crystalline phosphide in the lower area thereof in contact with the intermediate layer mainly containing silicon oxide (see FIG. 3), the coating adhesion of the insulation coating is significantly improved, and higher surface tension can be applied to the base steel sheet.

A method of forming the insulation coating including the crystalline phosphide-containing layer will be described later.

Some crystalline phosphides are conductive. However, since there is no crystalline phosphide in the upper area of the insulation coating (area excluding the crystalline phosphide-containing layer), the insulation properties of the insulation coating are maintained good.

When the thickness of the insulation coating (including the crystalline phosphide-containing layer) is less than 0.1 μm, the thickness of the crystalline phosphide-containing layer becomes thin, the coating adhesion of the insulation coating is not improved, and it becomes difficult to apply the required surface tension to the steel sheet. Therefore, the thickness thereof is preferably 0.1 μm or more on average. The thickness thereof is more preferably 0.5 μm or more.

On the other hand, when the thickness of the insulation coating (including the crystalline phosphide-containing layer) exceeds 10 μm, there is concern that cracks may be generated in the insulation coating at the stage of forming the insulation coating. Therefore, the thickness of the insulation coating is preferably 10 μm or less on average. The thickness thereof is more preferably 5 μm or less.

As necessary, magnetic domain refining treatment may be applied to apply local microstrain or form local grooves by laser, plasma, mechanical methods, etching, or other methods.

Moreover, in consideration of recent environmental problems, in the insulation coating, particularly the upper area (area excluding the crystalline phosphide-containing layer) of the insulation coating, the average of the Cr concentration as a chemical composition is preferably limited to less than 0.10 at %, and more preferably limited to less than 0.05 at %.

Crystalline Phosphide-Containing Layer

In the above four-layer structure, the crystalline phosphide-containing layer is included in the lower area of the insulation coating, is arranged in contact with the intermediate layer mainly containing silicon oxide, and is arranged in contact with the upper area of the insulation coating (area excluding the crystalline phosphide-containing layer) (see FIG. 3). The crystalline phosphide-containing layer is important to the insulation coating in order to secure excellent coating adhesion without unevenness.

The reason why the coating adhesion of the insulation coating is significantly improved when the crystalline phosphide-containing layer is included in the lower area of the insulation coating in contact with the intermediate layer mainly containing silicon oxide is not clear, but it is considered that "when a crystalline phosphide is included in the amorphous primary phase (the same component as the insulation coating) of a crystalline phosphide-containing layer, the overall elasticity of the crystalline phosphide-containing layer increases, stress accumulated between the intermediate layer and the insulation coating is relaxed even under bending stress, the coating adhesion of the insulation coating has no unevenness, and the insulation coating is less likely to delaminate".

When the thickness of the crystalline phosphide-containing layer exceeds ½ of the thickness of the insulation coating including the crystalline phosphide-containing layer, the tension applied to the base steel sheet by the insulation coating is relatively reduced, so that there is a possibility that the iron loss characteristics may deteriorate. Furthermore, there is concern that the insulation properties of the insulation coating may decrease. Therefore, it is preferable that the thickness of the crystalline phosphide-containing layer is ½ or less of the thickness of the insulation coating including the crystalline phosphide-containing layer on average. The thickness thereof is more preferably ⅓ or less. In other words, the thickness of the crystalline phosphide-containing layer is desirably equal to or less than the thickness of the insulation coating containing no crystalline phosphide on average, and more preferably ½ or less of the thickness of the insulation coating.

The lower limit of the thickness of the crystalline phosphide-containing layer is not particularly limited, but is preferably 1/10 or more of the thickness of the insulation coating including the crystalline phosphide-containing layer on average in terms of reliably securing the coating adhesion of the insulation coating. The lower limit thereof is more preferably 1/7 or more. In other words, the thickness of the crystalline phosphide-containing layer is preferably 1/9 or more of the thickness of the insulation coating having no crystalline phosphide on average, and more preferably ⅙ or more of the thickness of the insulation coating.

The amount of the crystalline phosphide included in the crystalline phosphide-containing layer is indicated by an area fraction (hereinafter sometimes referred to as "cross-sectional area fraction") which is the ratio of the total cross-sectional area of the crystalline phosphide to the cross-sectional area of the entire crystalline phosphide-containing layer containing the crystalline phosphide.

When the cross-sectional area fraction of the crystalline phosphide is small (the amount is small), the coating adhesion of the insulation coating is not improved, so that the cross-sectional area fraction of the crystalline phosphide is preferably 5% or more on average. The cross-sectional area fraction thereof is more preferably 10% or more.

On the other hand, when the cross-sectional area fraction of the crystalline phosphide is large (the amount is large), the proportion of amorphous materials in the crystalline phosphide-containing layer becomes small, and the adhesion between the crystalline phosphide-containing layer and the insulation coating (area in the insulation coating containing no crystalline phosphide-containing layer) decreases. Therefore, the cross-sectional area fraction of the crystalline phosphide is preferably 50% or less on average. The cross-sectional area fraction thereof is more preferably 35% or less.

When the grain size of the crystalline phosphide included in the crystalline phosphide-containing layer is small, the stress relaxation effect cannot be sufficiently obtained. Therefore, the equivalent circle diameter of the crystalline phosphide included in the crystalline phosphide-containing layer is preferably 5 nm or more on average. The equivalent circle diameter thereof is more preferably 10 nm or more.

On the other hand, when the grain size of the crystalline phosphide is large, the crystalline phosphide can be a fracture origin due to stress concentration, so that the equivalent circle diameter of the crystalline phosphide included in the crystalline phosphide-containing layer is preferably 300 nm or less on average. The equivalent circle diameter thereof is more preferably 270 nm or less. However, the equivalent circle diameter of the crystalline phosphide has to be smaller than the thickness of the crystalline phosphide-containing layer.

The crystalline phosphide contained in the crystalline phosphide-containing layer may be any kind of crystalline phosphide capable of obtaining the stress relaxation effect, and is not particularly limited to a specific crystalline phosphide.

For example, the crystalline phosphide is a compound containing phosphorus, and may be a compound containing Fe, Cr, P, and O in a total amount of 70 at % or more and 100 at % or less, and limiting Si to 10 at % or less, as a chemical composition. For example, the P content of the crystalline phosphide may be more than 0 at % and less than 70 at %. The remainder of the chemical composition of this compound may be impurities. The term "impurities" refers to those incorporated from raw materials, manufactured environments, and the like.

For example, the crystalline phosphide is preferably one or two or more of $Fe_3P$, $Fe_2P$, FeP, $FeP_2$, $Fe_2P_2O_7$, $(Fe,Cr)_3P$, $(Fe,Cr)_2P$, (Fe,Cr)P, $(Fe,Cr)P_2$, and $(Fe,Cr)_2P_2O_7$. Here, for example, (Fe,Cr)P means that a portion of Fe of FeP is substituted with Cr (the same applies to other crystalline phosphides). The substitution degree of Cr in the crystalline phosphide containing Cr is not particularly limited, but is preferably more than 0 at % and less than 70 at %.

For example, in a case where a crystalline phosphide in which a portion of Fe is not substituted with Cr is desired, it is preferable that at least one selected from the group consisting of FeP, $Fe_2P$, $Fe_3P$, $FeP_2$, and $Fe_2P_2O_7$ is contained as the crystalline phosphide.

Similarly, in a case where a crystalline phosphide in which a portion of Fe is substituted with Cr is desired, it is preferable that at least one selected from the group consisting of (Fe,Cr)P, $(Fe,Cr)_2P$, $(Fe,Cr)_3P$, $(Fe,Cr)P_2$, and $(Fe,Cr)_2P_2O_7$ is contained as the crystalline phosphide.

As described above, the feature of the electrical steel sheet of the present invention is that the crystalline phosphide-containing layer containing the crystalline phosphide is formed in the lower area of the insulation coating in contact with the intermediate layer mainly containing silicon oxide.

The composition (chemical composition) of the base steel sheet is not directly related to the presence of the crystalline phosphide-containing layer, so that the composition of the base steel sheet is not particularly limited in the electrical steel sheet of the present invention. However, since the grain-oriented electrical steel sheet is manufactured through various processes, preferable compositions of a base steel piece (slab) and the base steel sheet for manufacturing the electrical steel sheet of the present invention will be described below. Hereinafter, % related to the compositions of the base steel piece and the base steel sheet means mass %.

Composition of Base Steel Sheet

The base steel sheet of the electrical steel sheet of the present invention contains, for example, Si: 0.8% to 7.0%, C: 0.005% or less, N: 0.005% or less, the total amount of S and Se: 0.005% or less, acid-soluble Al: 0.005% or less, and a remainder consisting of Fe and impurities.

Si: 0.80% or More and 7.0% or Less

Si (silicon) increases the electric resistance of the grain-oriented electrical steel sheet and reduces the iron loss. A preferable lower limit of the Si content is 0.8%, and more preferably 2.0%. On the other hand, when the Si content exceeds 7.0%, the saturation magnetic flux density of the base steel sheet decreases, which makes it difficult to reduce the size of the core. A preferable upper limit of the Si content is 7.0%.

C: 0.005% or Less

C (carbon) forms a compound in the base steel sheet and degrades the iron loss, so that the amount thereof is preferably small. The C content is preferably limited to 0.005% or less. The upper limit of the C content is preferably 0.004%, and more preferably 0.003%. Since the amount of C is preferably small, the lower limit thereof includes 0%. However, when C is reduced to less than 0.0001% in amount, the manufacturing costs significantly increase. Therefore, a practical lower limit thereof is 0.0001% in terms of manufacturing.

N: 0.005% or Less

N (nitrogen) forms a compound in the base steel sheet and degrades the iron loss, so that the amount thereof is preferably small. The N content is preferably limited to 0.005% or less. The upper limit of the N content is preferably 0.004%, and more preferably 0.003%. Since the amount of N is preferably small, the lower limit thereof may be 0%.

Total Amount of S and Se: 0.005% or Less

S (sulfur) and Se (selenium) form a compound in the base steel sheet and degrade the iron loss, so that the amount thereof is preferably small. It is preferable to limit the amount of one of S and Se or the sum of the two to 0.005% or less. The total amount of S and Se is preferably 0.004% or less, and more preferably 0.003% or less. Since the S or Se content is preferably small, the lower limit of each thereof may be 0%.

Acid-Soluble Al: 0.005% or Less

Acid-soluble Al (acid-soluble aluminum) forms a compound in a base steel sheet and degrades the iron loss, so that the amount thereof is preferably small. The amount of the acid-soluble Al is preferably 0.005% or less. The amount of the acid-soluble Al is preferably 0.004% or less, and more preferably 0.003% or less. Since the amount of the acid-soluble Al is preferably small, the lower limit thereof may be 0%.

The remainder of the composition of the above-described base steel sheet consists of Fe and impurities. The term "impurities" refers to those incorporated from ore as a raw material, scrap, manufacturing environments, and the like when steel is industrially manufactured.

Furthermore, the base steel sheet of the electrical steel sheet of the present invention may contain, instead of a portion of Fe as the remainder, as optional elements, for example, at least one selected from Mn (manganese), Bi (bismuth), B (boron), Ti (titanium), Nb (niobium), V (vanadium), Sn (tin), Sb (antimony), Cr (chromium), Cu (copper), P (phosphorus), Ni (nickel), and Mo (molybdenum) within the range that does not inhibit the characteristics.

The amounts of the optional elements described above may be, for example, as follows. The lower limit of the optional elements is not particularly limited, and the lower limit may be 0%. Moreover, even if these optional elements are contained as impurities, the effect of the electrical steel sheet of the present invention is not impaired.

Mn: 0% or more and 0.15% or less,
Bi: 0% or more and 0.010% or less,
B: 0% or more and 0.080% or less,
Ti: 0% or more and 0.015% or less,
Nb: 0% or more and 0.20% or less,
V: 0% or more and 0.15% or less,
Sn: 0% or more and 0.30% or less,
Sb: 0% or more and 0.30% or less,
Cr: 0% or more and 0.30% or less,
Cu: 0% or more and 0.40% or less,
P: 0% or more and 0.50% or less,
Ni: 0% or more and 1.00% or less, and
Mo: 0% or more and 0.10% or less.

Composition of Base Steel Piece (Slab)

C (carbon) is an element effective in controlling a primary recrystallization texture. The amount of C is preferably 0.005% or more. The amount of C is more preferably 0.02% or more, 0.04% or more, and even more preferably 0.05% or more. When the amount of C exceeds 0.085%, decarburization does not proceed sufficiently in a decarburization process, and the required magnetic characteristics cannot be obtained, so that the amount of C is preferably 0.085% or less. The amount thereof is more preferably 0.065% or less.

When the amount of Si (silicon) is less than 0.80%, austenitic transformation occurs during final annealing, and alignment of grains in the Goss orientation is inhibited, so that the amount of Si is preferably 0.80% or more. On the other hand, when the amount of Si exceeds 4.00%, the base steel sheet is hardened, the workability is deteriorated, and it is difficult to perform cold rolling, so that it is necessary to cope with facilities for warm rolling and the like. From the viewpoint of workability, the amount of Si is preferably 4.00% or less. The amount thereof is more preferably 3.80% or less.

When the amount of Mn (manganese) is less than 0.03%, toughness decreases, and cracking easily occurs during hot rolling. Therefore, the amount of Mn is preferably 0.03% or more. The amount thereof is more preferably 0.06% or more. On the other hand, when the amount of Mn exceeds 0.15%, a large amount of MnS and/or MnSe are formed nonuniformly, and secondary recrystallization does not stably proceed, so that the amount of Mn is preferably 0.15% or less. The amount thereof is more preferably 0.13% or less.

When the amount of the acid-soluble Al (acid-soluble aluminum) is less than 0.010%, the precipitation amount of AN that functions as an inhibitor is insufficient, and secondary recrystallization does not stably and sufficiently proceed, so that the amount of the acid-soluble Al is preferably 0.010% or more. The amount thereof is more preferably 0.015% or more. On the other hand, when the amount of the acid-soluble Al exceeds 0.065%, AlN is coarsened and the function thereof as an inhibitor decreases. Therefore, the amount of the acid-soluble Al is preferably 0.065% or less. The amount thereof is more preferably 0.060% or less.

When the amount of N (nitrogen) is less than 0.004%, the precipitation amount of AlN functioning as an inhibitor is insufficient, and secondary recrystallization does not stably and sufficiently proceed, so that the amount of N is preferably 0.004% or more. The amount thereof is more preferably 0.006% or more. On the other hand, when the amount of N exceeds 0.015%, a large amount of nitrides are precipitated nonuniformly during hot rolling, which disturbs the progress of recrystallization. Therefore, the amount of N is preferably 0.015% or less. The amount thereof is more preferably 0.013% or less.

When the amount of one of S (sulfur) and Se (selenium) or the sum of the two is less than 0.005%, the precipitation amount of MnS and/or MnSe functioning as an inhibitor is insufficient, and secondary recrystallization does not stably and sufficiently proceed, so that the amount of one of S and Se or the sum of the two is preferably 0.005% or more. The amount thereof is more preferably 0.007% or more. On the other hand, when the total amount of S and Se exceeds 0.050%, purification is insufficient during final annealing and iron loss characteristics decrease. Therefore, the amount of one of S and Se or the sum of the two is preferably 0.050% or less. The amount thereof is more preferably 0.045% or less.

The remainder of the composition of the above-described base steel piece consists of Fe and impurities. The term "impurities" refers to those incorporated from ore, scrap as a raw material, manufacturing environments, and the like when steel is industrially manufactured.

Furthermore, the base steel piece of the electrical steel sheet of the present invention may contain, instead of a portion of Fe as the remainder, as optional elements, for example, one or two or more of P, Cu, Ni, Sn, and Sb within the range that does not inhibit the characteristics. The lower limit of the optional elements is not particularly limited, and the lower limit may be 0%.

P (phosphorus) is an element that increases the electrical resistivity of the base steel sheet and contributes to a reduction of the iron loss. However, when the amount thereof exceeds 0.50%, the hardness increases excessively and the rolling characteristics deteriorate. Therefore, the amount thereof is preferably 0.50% or less. The amount thereof is more preferably 0.35% or less.

Cu (copper) is an element that forms fine CuS or CuSe that functions as an inhibitor and contributes to the improvement in the magnetic characteristics. However, when the amount thereof exceeds 0.40%, the effect of improving the magnetic characteristics is saturated and surface defects are incurred during hot rolling. Therefore, the amount thereof is preferably 0.40% or less. The amount thereof is more preferably 0.35% or less.

Ni (nickel) is an element that increases the electrical resistivity of the base steel sheet and contributes to a reduction of the iron loss. However, when the amount thereof exceeds 1.00%, secondary recrystallization becomes unstable. Therefore, the amount of Ni is preferably 1.00% or less. The amount thereof is more preferably 0.75% or less.

Sn (tin) and Sb (antimony) are elements that segregate at grain boundaries and have a function of controlling the oxidation behavior during decarburization annealing. However, when the amount thereof exceeds 0.30%, decarburization does not easily proceed during the decarburization annealing, so that the amounts of both Sn and Sb are preferably 0.30% or less. The amount of each element is more preferably 0.25% or less.

Furthermore, the base steel piece of the electrical steel sheet of the present invention may adjunctively contain, instead of a portion of Fe as the remainder, as optional elements, for example, one or two or more of Cr, Mo, V, Bi, Nb, and Ti as an element forming an inhibitor. The lower limit of the optional elements is not particularly limited, and the lower limit may be 0%. The upper limits of these elements may be Cr: 0.30%, Mo: 0.10%, V: 0.15%, Bi: 0.010%, Nb: 0.20%, and Ti: 0.015%, respectively.

Next, a method of manufacturing the electrical steel sheet of the present invention will be described.

In a method of manufacturing a grain-oriented electrical steel sheet according to the present embodiment (hereinafter, sometimes referred to as the "manufacturing method of the present invention"), (a) a base steel sheet in which a film of an inorganic mineral material such as forsterite formed during final annealing is removed by pickling, grinding, or the like is annealed, or (b) a base steel sheet in which the formation of the film of the above-mentioned inorganic mineral material is suppressed during final annealing is annealed, (c) an intermediate layer mainly containing silicon oxide is formed on the surface of the base steel sheet by the above annealing (thermal oxidation annealing, annealing in an atmosphere with controlled dew point), (d) a crystalline phosphide-containing layer forming solution mainly containing a phosphate and colloidal silica and containing a crystalline phosphide is applied onto the intermediate layer and baked, (e) after the above baking, an insulation coating forming solution mainly containing a phosphate and colloidal silica and containing no crystalline phosphide is applied and further baked.

According to the manufacturing method of the present invention, the crystalline phosphide-containing layer in contact with the above-mentioned intermediate layer can be formed in the lower area of the insulation coating.

The base steel sheet in which a film of an inorganic mineral material such as forsterite is removed by pickling, grinding, or the like, and the base steel sheet in which the formation of the oxide layer of the above-mentioned inorganic mineral material is suppressed, are manufactured, for example, as follows.

A silicon steel piece containing 0.80 to 4.00 mass % of Si, preferably a silicon steel piece containing 2.0 to 4.0 mass % of Si is hot-rolled, is subjected to annealing as necessary after the hot rolling, is thereafter subjected to cold-rolling once or cold-rolling two times or more times with intermediate annealing therebetween, and is finished to a steel sheet having a final thickness. Next, the steel sheet having the final thickness is subjected to the decarburization annealing, and thereby, the primary recrystallization is proceeded in addition to decarburization, and an oxide layer is formed on the surface of the steel sheet.

Next, an annealing separator containing magnesia as a main component is applied onto the surface of the steel sheet having the oxide layer. After drying the annealing separator, the steel sheet is wound into a coil, and subjected to final annealing (secondary recrystallization). During the final annealing, a forsterite film mainly containing forsterite ($Mg_2SiO_4$) is formed on the surface of the steel sheet. The forsterite film is removed by pickling, grinding, or the like. After the removal, preferably, the surface of the steel sheet is finished smooth by chemical polishing or electrolytic polishing.

On the other hand, as the above-mentioned annealing separator, an annealing separator containing alumina as a main component can be used instead of magnesia. An annealing separator containing alumina as a main component is applied onto the surface of the steel sheet having the oxide layer, and dried. After drying the annealing separator, the steel sheet is wound into a coil, and subjected to final annealing (secondary recrystallization). In a case where the annealing separator containing alumina as a main component is used, the formation of a film of an inorganic mineral material such as forsterite on the surface of the steel sheet is suppressed even when final annealing is performed. After the final annealing, preferably, the steel sheet surface is finished smooth by chemical polishing or electrolytic polishing.

By annealing the base steel sheet in which the film of the inorganic mineral material such as forsterite is removed or the base steel sheet in which the formation of the film of the inorganic mineral material such as forsterite is suppressed under typical annealing conditions, an intermediate layer mainly containing silicon oxide is formed on the surface of the base steel sheet.

The annealing atmosphere is preferably a reducing atmosphere so as not to cause the inside of the steel sheet to be oxidized, and is particularly preferably a nitrogen atmosphere in which hydrogen is mixed. For example, an atmosphere containing hydrogen:nitrogen at 75%:25% with a dew point of −20° C. to 0° C. is preferable.

The thickness of the intermediate layer mainly containing silicon oxide is controlled by appropriately controlling one or two or more of the conditions of the annealing temperature, the holding time, and the dew point of the annealing atmosphere. The thickness of the intermediate layer is preferably 2 to 400 nm on average in terms of securing the coating adhesion of the insulation coating. The thickness thereof is more preferably 5 to 300 nm.

A crystalline phosphide-containing layer forming solution mainly containing a phosphate and colloidal silica and containing a crystalline phosphide is applied onto the intermediate layer mainly containing silicon oxide and then baked.

As the crystalline phosphide, a compound containing Fe, Cr, P, and O in a total amount of 70 at % or more and 100 at % or less, and limiting Si to 10 at % or less, as a chemical composition, may be used. The remainder of the chemical composition of this compound may be impurities.

For example, the crystalline phosphide is preferably one or two or more of $Fe_3P$, $Fe_2P$, FeP, $FeP_2$, $Fe_2P_2O_7$, $(Fe,Cr)_3P$, $(Fe,Cr)_2P$, (Fe,Cr)P, $(Fe,Cr)P_2$, and $(Fe,Cr)_2P_2O_7$.

The average diameter of the crystalline phosphide is preferably 10 to 300 nm. The crystalline phosphide in the crystalline phosphide-containing layer forming solution is preferably contained in a mass ratio of 3 to 35%.

In the manufacturing method of the present invention, after the above baking using the crystalline phosphide-containing layer forming solution, an insulation coating forming solution mainly containing a phosphate and colloidal silica and containing no crystalline phosphide is applied and further baked.

By the above two baking annealing processes, a crystalline phosphide-containing layer in contact with the intermediate layer and an insulation coating which is in contact with the crystalline phosphide-containing layer and contains no crystalline phosphide can be formed.

The above baking is performed by a heat treatment at 350° C. to 1150° C. for 5 to 300 seconds in a water vapor-nitrogen-hydrogen mixed atmosphere in which the oxidation degree $P_{H2O}/P_{H2}$ of the atmosphere is 0.001 to 1.0. By this heat treatment, the insulation coating having the crystalline phosphide-containing layer in contact with the intermediate layer can be formed in the lower area. In order to exhibit the adhesion of the insulation coating with good reproducibility, it is more preferable to set the oxidation degree $P_{H2O}/P_{H2}$ to 0.01 to 0.15, the baking temperature to 650° C. to 950° C., and the holding time to 30 to 270 seconds. After the heat treatment, the steel sheet is cooled with the oxidation degree of the atmosphere kept low so that the crystalline phosphide does not change chemically (the crystalline phosphide does not take in moisture and deteriorate upon cooling). The cooling atmosphere is preferably an atmosphere having an oxidation degree $P_{H2O}/P_{H2}$ of 0.01 or less.

Each layer of the electrical steel sheet of the present invention sheet is observed and measured as follows.

A test piece is cut out from the grain-oriented electrical steel sheet in which the insulation coating is formed, and the layering structure of the test piece is observed with a scanning electron microscope (SEM) or a transmission electron microscope (TEM).

Specifically, first, a test piece is cut out so that the cutting direction is parallel to the thickness direction (specifically, the test piece is cut out so that the cross section is parallel to the thickness direction and perpendicular to the rolling direction), and the cross-sectional structure of this cross section is observed with an SEM at a magnification at which each layer is included in the observed visual field. For example, in observation with a reflection electron composition image (COMP image), it can be inferred how many layers the cross-sectional structure includes. For example, in the COMP image, the steel sheet can be distinguished as light color, the intermediate layer as dark color, and the insulation coating as intermediate color.

In order to identify each layer in the cross-sectional structure, line analysis is performed along the thickness direction using SEM-EDS (energy dispersive X-ray spectroscopy), and quantitative analysis of the chemical composition of each layer is performed. The elements to be quantitatively analyzed are five elements Fe, P, Si, O, and Mg.

From the observation results in the COMP image and the quantitative analysis results by SEM-EDS, in a case where an area has an Fe content of 80 at % or more excluding measurement noise, and the line segment (thickness) on the scanning line of the line analysis corresponding to this area is 300 nm or more, the area is determined as the base steel sheet, and an area excluding the base steel sheet is determined as the intermediate layer and the insulation coating (including the crystalline phosphide-containing layer).

Regarding the area excluding the base steel sheet identified above, from the observation results in the COMP image and the quantitative analysis results by SEM-EDS, in a case where an area has an Fe content of less than 80 at %, a P content of 5 at % or more, a Si content of less than 20 at %, an O content of 50 at % or more, and a Mg content of 10 at % or less excluding the measurement noise, and the line segment (thickness) on the scanning line of the line analysis corresponding to this area is 300 nm or more, the area is determined as the insulation coating (including the crystalline phosphide-containing layer).

In addition, in order to determine the area which is the insulation coating (including the crystalline phosphide-containing layer), precipitates, inclusions, and the like which are contained in the insulation coating are not considered as determination objects, but the area that satisfies the quantitative analysis results as a matrix is determined as the insulation coating (including the crystalline phosphide-containing layer). For example, when the presence of precipitates, inclusions, and the like on the scanning line of the line analysis is confirmed from the COMP image or the line analysis results, this area is not considered for the determination of the insulation coating, and the insulation coating is determined by the quantitative analysis results as the matrix. The precipitates and inclusions can be distinguished from the matrix by contrast in the COMP image, and can be distinguished from the matrix by the amounts of constituent elements included in the quantitative analysis results.

In a case where an area excludes the base steel sheet and the insulation coating (including the crystalline phosphide-containing layer) identified above and the line segment (thickness) on the scanning line of the line analysis corresponding to this area is 300 nm or more, this area is determined as the intermediate layer. In addition, it is preferable to identify the intermediate layer using TEM as necessary.

The identification of each layer and the measurement of the thickness by the above-mentioned COMP image observation and SEM-EDS quantitative analysis are performed on five places or more while changing the observed visual field. Regarding the thicknesses of the intermediate layer and the insulation coating (including the crystalline phosphide-containing layer) obtained from five places or more in total, an average value is calculated by excluding the maximum value and the minimum value from the values, and this average value is taken as the average thickness of the intermediate layer and the average thickness of the insulation coating (including the crystalline phosphide-containing layer).

In addition, if a layer in which the line segment (thickness) on the scanning line of the line analysis is less than 300 nm is included in at least one of the observed visual fields of five places or more as described above, the layer is observed in detail by TEM, and the identification of the corresponding layer and the measurement of the thickness are performed by TEM.

A test piece including a layer to be observed in detail using TEM is cut out by focused ion beam (FIB) processing so that the cutting direction is parallel to the thickness direction (specifically, a test piece is cut out so that the cross section is parallel to the thickness direction and perpendicular to the rolling direction), and the cross-sectional structure of this cross section is observed (bright-field image) with a scanning-TEM (STEM) at a magnification at which the corresponding layer is included in the observed visual field. In a case where each layer is not included in the observed visual field, the cross-sectional structure is observed in a plurality of continuous visual fields.

In order to identify each layer in the cross-sectional structure, line analysis is performed along the thickness direction using TEM-EDS, and quantitative analysis of the chemical composition of each layer is performed. The elements to be quantitatively analyzed are five elements Fe, P, Si, O, and Mg.

From the observation results of the bright-field image by TEM described above and the quantitative analysis results by TEM-EDS, each layer is identified and the thickness of each layer is measured.

An area having an Fe content of 80 at % or more excluding the measurement noise is determined as the base steel sheet, and an area excluding this base steel sheet is determined as the intermediate layer and the insulation coating (including the crystalline phosphide-containing layer).

Regarding the area excluding the base steel sheet identified above, from the observation results of the bright-field image and the quantitative analysis results by TEM-EDS, an area having an Fe content of less than 80 at %, a P content of 5 at % or more, a Si content of less than 20 at %, an O content of 50 at % or more, and a Mg content of 10 at % or less excluding the measurement noise is determined as the insulation coating (including the crystalline phosphide-containing layer). In addition, in order to determine the area which is the insulation coating (including the crystalline phosphide-containing layer), precipitates, inclusions, and the like which are contained in the insulation coating are not considered as determination objects, but the area that satisfies the quantitative analysis results as a matrix is determined as the insulation coating (including the crystalline phosphide-containing layer).

An area excluding the base steel sheet and the insulation coating (including the crystalline phosphide-containing layer) identified above is determined as the intermediate layer. This intermediate layer may satisfy an Fe content of less than 80 at % on average, a P content of less than 5 at % on average, and a Si content of 20 at % or more on average, a O content of 50 at % or more on average, and a Mg content of 10 at % or less on average as the average of the entire intermediate layer. In addition, the quantitative analysis results of the above-mentioned intermediate layer do not include analysis results of precipitates, inclusions, and the like contained in the intermediate layer but are quantitative analysis results as a matrix.

The line segment (thickness) on the scanning line of the line analysis is measured for the intermediate layer and the insulation coating (including the crystalline phosphide-containing layer) identified above. When the thickness of each layer is 5 nm or less, it is preferable to use a TEM having a spherical aberration correction function from the viewpoint of spatial resolution. When the thickness of each layer is 5 nm or less, point analysis is performed, for example, at intervals of 2 nm along the thickness direction, the line segment (thickness) of each layer is measured, and this line segment may be adopted as the thickness of each layer. For example, when TEM having a spherical aberration correction function is used, EDS analysis can be performed with a spatial resolution of about 0.2 nm.

The observation and measurement with the above-mentioned TEM are performed on five places or more while changing the observed visual field. Regarding the measurement results obtained from five places or more in total, an average value is calculated by excluding the maximum value and the minimum value from the values, and this average value is adopted as the average thickness of the corresponding layer.

In the electrical steel sheet of the present invention, the intermediate layer is included in contact with the base steel sheet, and the insulation coating (including the crystalline phosphide-containing layer) is included in contact with the intermediate layer. Therefore, in a case of identifying each layer according to the above-described criterion, layers other than the base steel sheet, the intermediate layer, and the insulation coating (including the crystalline phosphide-containing layer) are not included.

In addition, the amounts of Fe, P, Si, O, Mg, and the like contained in the base steel sheet, the intermediate layer, and the insulation coating described above are a criterion for identifying the base steel sheet, the intermediate layer, and the insulation coating and obtaining the thicknesses thereof.

Next, it is confirmed whether or not a crystalline phosphide-containing layer is included in the insulation coating identified above.

Based on the identification results of the insulation coating (including the crystalline phosphide-containing layer), a test piece including the insulation coating is cut out by FIB processing so that the cutting direction is parallel to the thickness direction (specifically, a test piece is cut out so that the cross section is parallel to the thickness direction and perpendicular to the rolling direction), and the cross-sectional structure of this cross section is observed with a TEM at a magnification at which the insulation coating is included in the observed visual field.

Wide-area electron beam diffraction is performed on the insulation coating in the observed visual field with an electron beam diameter of smaller of 1/10 of the insulation coating and 200 nm and it is checked whether or not any crystalline phase is included in the electron beam irradiated area by the electron beam diffraction pattern.

In a case where it can be confirmed that a crystalline phase is included by the above-mentioned electron beam diffraction pattern, the crystalline phase as an object is confirmed in a bright-field image, and point analysis is performed on the crystalline phase by TEM-EDS. As a result of point analysis by TEM-EDS, when the chemical composition of the crystalline phase as the object contains Fe, Cr, P, O in a total amount of 70 at % or more and 100 at % or less and 10 at % or less of Si, the crystalline phase can be determined to be crystalline and a phosphorus-containing phase. Therefore, the crystalline phase is determined as a crystalline phosphide.

As necessary, electron beam diffraction is performed on the crystalline phase as the object with a narrowed electron beam so as to obtain information from only the crystalline phase as the object, and the crystal structure of the crystalline phase as the object is identified from the electron beam diffraction pattern. This identification may be performed using the Powder Diffraction File (PDF) of the International Centre for Diffraction Data (ICDD).

From TEM-EDS point analysis results and the electron beam diffraction results described above, it can be determined whether or not the crystalline phase is $Fe_3P$, $Fe_2P$, FeP, $FeP_2$, $Fe_2P_2O_7$, $(Fe,Cr)_3P$, $(Fe,Cr)_2P$, (Fe,Cr)P, $(Fe,Cr)P_2$, or $(Fe,Cr)_2P_2O_7$.

In addition, identification of whether the crystalline phase is $Fe_3P$ may be performed based on PDF: No. 01-089-2712. Identification of whether the crystalline phase is $Fe_2P$ may be performed based on PDF: No. 01-078-6749. Identification of whether the crystalline phase is FeP may be performed based on PDF: No. 03-065-2595. Identification of whether the crystalline phase is $FeP_2$ may be performed based on PDF: No. 01-089-2261. Identification of whether the crystalline phase is $Fe_2P_2O_7$ may be performed based on PDF: No. 01-076-1762. Identification of whether the crystalline phase is $(Fe,Cr)_3P$ may be performed based on PDF: No. 01-089-2712 for $Fe_3P$ or PDF: No. 03-065-1607 for $Cr_3P$. Identification of whether the crystalline phase is $(Fe,Cr)_2P$ may be performed based on PDF: No. 01-078-6749 for $Fe_2P$ or PDF: No. 00-045-1238 for $Cr_2P$. Identification of whether the crystalline phase is (Fe,Cr)P may be performed based on PDF: No. 03-065-2595 for FeP or PDF: No. 03-065-1477 for CrP. Identification of whether the crystalline phase is $(Fe,Cr)P_2$ may be performed based on PDF: No. 01-089-2261 for $FeP_2$ or PDF: No. 01-071-0509 for $CrP_2$. Identification of whether the crystalline phase is $(Fe,Cr)_2P_2O_7$ may be performed based on PDF: No. 01-076-1762 for $Fe_2P_2O_7$ or PDF: No. 00-048-0598 for $Cr_2P_2O_7$. In a case where the crystalline phase is identified based on the PDF described above, the identification may be performed with an interplanar spacing of +5% and an interplanar angle tolerance of ±3°.

Confirmation (wide-area electron beam irradiation) of whether or not any crystalline phase is included in the electron beam irradiated area is performed sequentially along the thickness direction from the interface between the insulation coating (including the crystalline phosphide-containing layer) and the intermediate layer toward the outermost surface without a gap, and the confirmation of the electron beam diffraction pattern is repeated until it is confirmed that no crystalline phase is included in the electron beam irradiated area.

By repeating the electron beam irradiation along the thickness direction, whether or not a crystalline phosphide is included in the insulation coating and the area where the crystalline phosphide in the insulation coating is included can be identified. The area where the crystalline phosphide is included in the insulation coating is determined as the crystalline phosphide-containing layer.

Regarding the crystalline phosphide-containing layer identified above, the line segment (thickness) of the crystalline phosphide-containing layer on the scanning line of the electron beam irradiation, that is, the line segment (thickness) of the area where the crystalline phosphide is included in the insulation coating in the thickness direction is measured.

The above-described confirmation of whether or not the crystalline phosphide-containing layer is included in the crystalline phosphide is performed on five places or more while changing the observed visual field. Regarding the thickness of the crystalline phosphide-containing layer obtained from five places or more in total, an average value is calculated by excluding the maximum value and the minimum value from the values, and this average value is adopted as the average thickness of the crystalline phosphide-containing layer.

In addition, the area fraction of the crystalline phosphide is obtained by image analysis based on the crystalline phosphide-containing layer identified above and the crystalline phosphide identified above. Specifically, the area fraction of the crystalline phosphide is obtained from the total cross-sectional area of the crystalline phosphide-containing layer included in the area subjected to the electron beam irradiation (wide-area electron beam irradiation) on the observed visual fields of five places or more in total, and the total cross-sectional area of the crystalline phosphide included in the crystalline phosphide-containing layer. For example, a value obtained by dividing the above-mentioned total cross-sectional area of the crystalline phosphide by the above-mentioned total cross-sectional area of the crystalline phosphide-containing layer is adopted as the average area fraction of the crystalline phosphide. Regarding image binarization for image analysis, image binarization may be performed by manually coloring the crystalline phosphide-containing layer and the crystalline phosphide in the photograph based on the above-described identification result of the crystalline phosphide.

In addition, based on the crystalline phosphide identified above, the equivalent circle diameter of the crystalline phosphide is obtained by image analysis. The equivalent circle diameters of at least five crystalline phosphides are obtained in each of the observed visual fields of five places or more, an average value is calculated by excluding the maximum value and the minimum value from the obtained equivalent circle diameters, and this average value is adopted as the average equivalent circle diameter of the crystalline phosphide. Regarding image binarization for image analysis, image binarization may be performed by manually coloring the crystalline phosphide in the photograph based on the above-described identification result of the crystalline phosphide.

The Cr content in the area of the insulation coating excluding the crystalline phosphide-containing layer may be obtained in terms of unit at % by SEM-EDS quantitative analysis or TEM-EDS quantitative analysis.

Furthermore, Ra (arithmetic average roughness) of the surface of the base steel sheet may be measured using a stylus type surface roughness measuring device.

The coating adhesion of the insulation coating is evaluated by conducting a bending adhesion test. A 80 mm×80 mm test piece having a flat plate shape is rolled around a round bar with a diameter of 20 mm and is stretched flat, the area of the insulation coating that does not delaminate from the electrical steel sheet is measured, a value obtained by dividing the area that does not delaminate by the area of the steel sheet is defined as the area fraction of remained coating (%), and the coating adhesion of the insulation coating is evaluated. For example, calculation may be performed by placing a transparent film with a 1-mm grid scale on the test piece and measuring the area of the insulation coating that does not delaminate.

The iron loss ($W_{17/50}$) of the grain-oriented electrical steel sheet is measured at an alternating current frequency of 50 Hz and an induced magnetic flux density of 1.7 Tesla.

EXAMPLES

Hereinafter, the effects of an aspect of the present invention will be described in detail with reference to the following examples. However, the condition in the examples is an example condition employed to confirm the operability and the effects of the present invention, so that the present invention is not limited to the example condition. The present invention can employ various types of conditions as long as the conditions do not depart from the scope of the present invention and can achieve the object of the present invention.

Example 1

A base steel piece having the composition shown in Table 1 was heat-treated at 1150° C. for 60 minutes and then subjected to hot rolling to obtain a hot-rolled steel sheet having a thickness of 2.3 mm. Next, the hot-rolled steel sheet was subjected to hot-band annealing in which the hot-rolled steel sheet was held at 1120° C. for 200 seconds, immediately cooled, held at 900° C. for 120 seconds, and then rapid cooled. The hot-band annealed sheet was pickled and then subjected to cold rolling to obtain a cold-rolled steel sheet having a final thickness of 0.23 mm.

TABLE 1

| BASE STEEL PIECE | COMPOSITION (MASS %) | | | | | |
|---|---|---|---|---|---|---|
| | Si | C | Al | Mn | S | N |
| A | 3.25 | 0.052 | 0.029 | 0.110 | 0.007 | 0.008 |

The cold-rolled steel sheet (hereinafter referred to as "steel sheet") was subjected to decarburization annealing at 850° C. for 180 seconds in an atmosphere containing hydrogen:nitrogen at 75%:25%. The steel sheet after the decarburization annealing was subjected to nitriding annealing at 750° C. for 30 seconds in a mixed atmosphere of hydrogen-nitrogen-ammonia to control the nitrogen content of the steel sheet to 230 ppm.

An annealing separator containing alumina as a main component was applied to the steel sheet after the nitriding annealing. Subsequently, the steel sheet was subjected to final annealing by being heated to 1200° C. at a heating rate of 15° C./hr in a mixed atmosphere of hydrogen and nitrogen, and then was subjected to purification annealing by being held at 1200° C. for 20 hours in a hydrogen atmosphere. Then, the steel sheet was naturally cooled, whereby a base steel sheet having a smooth surface was obtained.

The obtained base steel sheet was annealed at 950° C. for 240 seconds in an atmosphere of 25% $N_2$+75% $H_2$ with a dew point of −2° C., whereby an intermediate layer mainly containing silicon oxide and having an average thickness of 9 nm was formed on the surface of the base steel sheet.

A crystalline phosphide-containing layer forming solution having a crystalline phosphide was applied on the intermediate layer mainly containing silicon oxide and baked, whereby a crystalline phosphide-containing layer was formed. In order to reliably form the crystalline phosphide-containing layer in contact with the intermediate layer mainly containing silicon oxide in the lower area of an insulation coating and to reliably secure the insulation properties of the insulation coating, an insulation coating forming solution was further applied and baked, whereby the insulation coating containing no crystalline phosphide was formed. As described above, two times of application and baking treatments were performed.

In the first treatment, a solution obtained by stirring and mixing 0 to 40 parts by mass of fine powder of one or two or more crystalline phosphides of FeP, (Fe,Cr)P, $Fe_2P$, $(Fe,Cr)_2P$, $Fe_3P$, $FeP_2$, $Fe_2P_2O_7$, and $(Fe,Cr)_2P_2O_7$ in 100 parts by mass of a solution mainly containing an aqueous solution of magnesium phosphate, colloidal silica, and chromic anhydride was used as a crystalline phosphide-containing layer forming solution, and the crystalline phosphide-containing layer forming solution was applied at X (=1/10 to 1/2) times the typical application amount and baked under the baking annealing conditions shown in Table 2.

The grain size of the crystalline phosphide mixed in the crystalline phosphide-containing layer forming solution was 10 to 300 nm in terms of average diameter except for Test Piece A5. The grain size of the crystalline phosphide mixed in the crystalline phosphide-containing layer forming solution used for the production of Test Piece A5 was more than 300 nm in terms of average diameter.

In the cooling after the baking, the oxidation degree $P_{H2O}/P_{H2}$ of the atmosphere during cooling was set as follows except for Test Piece A9 so that the crystalline phosphide-containing layer did not take in moisture on the way to the cooling (heat shrinkage) and the crystalline phosphide did not deteriorate.

Temperature range from baking temperature to 700° C.: $P_{H2O}/P_{H2} \leq 0.01$ Temperature range from 700° C. to 300° C.: $P_{H2O}/P_{H2} \leq 0.008$ By this application, baking, and cooling, the crystalline phosphide can be distributed in the lower area of the insulation coating and the crystalline phosphide-containing layer in contact with the intermediate layer can be formed.

In the second treatment, an insulation coating forming solution containing not containing the crystalline phosphide as described above was applied at (1−X) times the typical application amount (see Table 3) and baked under the same baking annealing conditions as in the first treatment. By this application and baking, the insulation coating containing no crystalline phosphide and having good insulation properties can be formed on the crystalline phosphide-containing layer.

Table 2 shows the application, baking, and cooling conditions for the first treatment.

TABLE 2

| TEST PIECE | APPLICATION AMOUNT FOR FIRST TREATMENT ($mg/m^2$) | CRYSTALLINE PHOSPHIDE MIXED IN APPLICATION SOLUTION | MASS RATIO OF MIXED CRYSTALLINE PHOSPHIDE (%) | OXIDATION DEGREE OF ATMOSPHERE DURING BAKING ($P_{H2O}/P_{H2}$) | BAKING TEMPERATURE (° C.) |
|---|---|---|---|---|---|
| A1 | 0.5 | — | — | 0.15 | 800 |
| A2 | 0.5 | $Fe_3P$ | 5 | 0.15 | 800 |
| A3 | 1.0 | $Fe_2P$ | 5 | 0.1 | 820 |
| A4 | 1.0 | $Fe_2P$ | 40 | 0.1 | 820 |
| A5 | 1.5 | FeP (COARSE) | 10 | 0.06 | 840 |
| A6 | 1.5 | FeP | 1 | 0.06 | 840 |
| A7 | 2.0 | FeP, $FeP_2$ | 15 | 0.06 | 840 |
| A8 | 2.0 | $Fe_2P_2O_7$ | 10 | 0.015 | 860 |
| A9 | 2.0 | $Fe_2P_2O_7$ | 10 | 0.015 | 860 |
| A10 | 2.5 | $Fe_2P_2O_7$ | 10 | 0.015 | 860 |
| A11 | 5.0 | — | — | 0.15 | 810 |

| TEST PIECE | HOLDING TIME (SEC.) | OXIDATION DEGREE OF ATMOSPHERE DURING COOLING($P_{H2O}/P_{H2}$) BAKING TEMPERATURE ~700° C. | 700~300° C. | REMARKS |
|---|---|---|---|---|
| A1 | 120 | 0.007 | 0.007 | COMPARATIVE EXAMPLE |

TABLE 2-continued

| | | | | |
|---|---|---|---|---|
| A2 | 120 | 0.007 | 0.007 | INVENTION EXAMPLE |
| A3 | 90 | 0.007 | 0.007 | INVENTION EXAMPLE |
| A4 | 90 | 0.007 | 0.007 | INVENTION EXAMPLE |
| A5 | 45 | 0.01 | 0.005 | INVENTION EXAMPLE |
| A6 | 45 | 0.01 | 0.005 | INVENTION EXAMPLE |
| A7 | 45 | 0.005 | 0.005 | INVENTION EXAMPLE |
| A8 | 30 | 0.006 | 0.006 | INVENTION EXAMPLE |
| A9 | 30 | 0.015 | 0.015 | INVENTION EXAMPLE |
| A10 | 30 | 0.006 | 0.006 | INVENTION EXAMPLE |
| A11 | 120 | 0.007 | 0.007 | COMPARATIVE EXAMPLE |

Based on the observation and measurement methods described above, a test piece was cut out from the grain-oriented electrical steel sheet in which the insulation coating is formed, the layering structure of the test piece was observed with a scanning electron microscope (SEM) or a transmission electron microscope (TEM), and the thickness of the insulation coating and the thickness of the crystalline phosphide-containing layer were measured.

In the TEM image of the crystalline phosphide-containing layer, the chemical composition of the crystalline phosphide was analyzed by TEM-EDS, and the structure of the crystalline phosphide was identified by electron beam diffraction.

In the TEM image of the crystalline phosphide-containing layer, the matrix (insulation coating portion) and the crystalline phosphide were binarized and distinguished from each other, and from the total cross-sectional area of the crystalline phosphide, the area fraction (%) of the crystalline phosphide was calculated by image analysis.

In the TEM image of the crystalline phosphide-containing layer, the matrix (insulation coating portion) and the crystalline phosphide were binarized and distinguished from each other, and the equivalent circle diameter of the crystalline phosphide was obtained by image analysis. The results are shown in Table 3.

Next, a 80 mm×80 mm test piece was cut out from the grain-oriented electrical steel sheet in which the insulation coating was formed, and rolled around a round bar with a diameter of 20 mm and stretched flat, the area of the insulation coating that does not delaminate from the electrical steel sheet was measured, and the area fraction of remained coating was calculated. The results are also shown in Table 3.

TABLE 3

| TEST PIECE | APPLICATION AMOUNT FOR SECOND TREATMENT ($mg/m^2$) | THICKNESS OF INSULATION COATING CONTAINED IN CRYSTALLINE PHOSPHIDE-CONTAINING LAYER (μm) | CRYSTALLINE PHOSPHIDE-CONTAINING LAYER THICKNESS (μm) | CRYSTALLINE PHOSPHIDE-CONTAINING LAYER CRYSTALLINE PHOSPHIDE | CRYSTALLINE PHOSPHIDE-CONTAINING LAYER AVERAGE GRAIN SIZE (nm) |
|---|---|---|---|---|---|
| A1 | 4.5 | 3.8 | — | — | — |
| A2 | 4.5 | 3.9 | 0.4 | $Fe_3P$ | 7 |
| A3 | 4.0 | 3.9 | 0.7 | $Fe_2P$ | 32 |
| A4 | 4.0 | 3.9 | 1.1 | $Fe_2P$, $(Fe, Cr)_2P$ | 91 |
| A5 | 3.5 | 4.0 | 1.3 | FeP (COARSE) | <u>445</u> |
| A6 | 3.5 | 4.0 | 1.2 | FeP | 33 |
| A7 | 3.0 | 4.1 | 1.6 | FeP, $FeP_2$, (Fe, Cr)P | 64 |
| A8 | 3.0 | 4.1 | 1.5 | $Fe_2P_2O_7$, $(Fe, Cr)_2P_2O_7$ | 126 |
| A9 | 3.0 | 4.1 | 1.6 | $Fe_2P_2O_7$, $(Fe, Cr)_2P_2O_7$ | <u>336</u> |
| A10 | 2.5 | 4.2 | 2.2 | $Fe_2P_2O_7$, $(Fe, Cr)_2P_2O_7$ | 252 |
| A11 | — | 3.8 | — | — | — |

TABLE 3-continued

| TEST PIECE | TOTAL CROSS-SECTIONAL AREA FRACTION OF THE CRYSTALLINE PHOSPHIDE (%) | AREA FRACTION OF REMAINED COATING (%) | IRON LOSS $W_{17/50}$ (W/kg) | REMARKS |
|---|---|---|---|---|
| A1 | — | 83 | 0.71 | COMPARATIVE EXAMPLE |
| A2 | 8 | 93 | 0.63 | INVENTION EXAMPLE |
| A3 | 9 | 96 | 0.63 | INVENTION EXAMPLE |
| A4 | 55 | 84 | 0.67 | INVENTION EXAMPLE |
| A5 | 15 | 85 | 0.69 | INVENTION EXAMPLE |
| A6 | 3 | 86 | 0.66 | INVENTION EXAMPLE |
| A7 | 25 | 95 | 0.64 | INVENTION EXAMPLE |
| A8 | 17 | 94 | 0.64 | INVENTION EXAMPLE |
| A9 | 14 | 87 | 0.68 | INVENTION EXAMPLE |
| A10 | 16 | 89 | 0.70 | INVENTION EXAMPLE |
| A11 | — | 82 | 0.71 | COMPARATIVE EXAMPLE |

Although not shown in the table, the chemical composition of the crystalline phosphide contained in the crystalline phosphide-containing layer included Fe, Cr, P, and O in a total amount of 70 at % or more and 100 at % or less and 10 at % or less of Si.

It can be seen that in the invention examples having the crystalline phosphide-containing layer, the area fraction of remained coating was higher and the coating adhesion of the insulation coating was significantly superior to those of Comparative Examples A1 and A11 having no crystalline phosphide-containing layer. It is considered that the stress accumulated inside was relaxed by the coexistence of amorphous and crystalline materials in the crystalline phosphide-containing layer in a well-balanced manner, and thus unevenness in the coating adhesion had disappeared.

In particular, in Test Pieces A2, A3, A7, and A8, since the amount and size of the crystalline phosphide included, and the thickness of the crystalline phosphide-containing layer are suitable, not only coating adhesion but also iron loss characteristics are extremely excellent.

On the other hand, it is considered that since the total cross-sectional area fraction of the crystalline phosphide in the crystalline phosphide-containing layer of Test Piece A4 was as high as 55%, the proportion of amorphous materials was small, and conversely, since the total cross-sectional area fraction of the crystalline phosphide in the crystalline phosphide-containing layer of Test Piece A6 was as low as 3%, the proportion of crystalline materials was small, and the coating adhesion was improved only slightly.

It is considered that since the average grain size of the crystalline phosphide of Test Piece A5 was as large as 445 nm and the average grain size of the crystalline phosphide of Test Piece A9 was as large as 336 nm, the crystalline phosphide became a fracture origin due to stress concentration, and the coating adhesion was improved only slightly. Although the crystalline phosphide-containing layer of Test Piece A9 corresponded to the configuration of the present invention, since the oxidation degree $P_{H2O}/P_{H2}$ of the atmosphere during cooling after baking was higher than 0.01, there was a possibility that the crystalline phosphide-containing layer may take in a small amount of moisture on the way to cooling, the coating adhesion may deteriorate, and the crystalline phase may be degraded by some mechanism.

It is considered that although the coating adhesion of Test Piece A10 was good, the insulation coating having no crystalline phosphide-containing layer was thin, so that tension to the steel sheet could not be maximized and the iron loss characteristics were improved only slightly.

Although $(Fe,Cr)_2P$ was detected in Test Piece A4, $(Fe,Cr)P$ in Test Piece A7, and $(Fe,Cr)_2P_2O_7$ in Test Pieces A8 to A10, these were formed by the reaction between Cr derived from chromic anhydride contained in the insulation coating forming solution and the crystalline phosphide. The substitution ratio of Cr to Fe was in a range of 5% to 65% by atomic ratio.

Also, a test was conducted under the same manufacturing conditions as those of Test Piece A2 described above, but changing only the crystalline phosphide mixed in the crystalline phosphide-containing layer forming solution.

Test Piece A12 was manufactured by mixing $(Fe,Cr)_3P$ in the solution, and it was confirmed that $(Fe,Cr)_3P$ was included in the crystalline phosphide-containing layer.

Test Piece A13 was manufactured by mixing $(Fe,Cr)P_2$ in the solution, and it was confirmed that $(Fe,Cr)P_2$ was included in the crystalline phosphide-containing layer.

It was confirmed that the evaluation results of Test Pieces A12 and A13 were equivalent to the evaluation results of Test Piece A2.

INDUSTRIAL APPLICABILITY

According to the aspect of the present invention, it is possible to provide a grain-oriented electrical steel sheet provided with an insulation coating having no unevenness in coating adhesion, that is, a grain-oriented electrical steel sheet excellent in the coating adhesion of insulation coating even without a forsterite film. Therefore, industrial applicability is high.

BRIEF DESCRIPTION OF THE REFERENCE SYMBOLS

1 base steel sheet
2 forsterite film
3 insulation coating
4 intermediate layer
5 crystalline phosphide
6 crystalline phosphide-containing layer

What is claimed is:

1. A grain-oriented electrical steel sheet comprising:

a base steel sheet;

an intermediate layer arranged in contact with the base steel sheet; and an insulation coating arranged in contact with the intermediate layer to be an outermost surface, wherein the insulation coating has a crystalline phosphide-containing layer containing a crystalline phosphide in an area in contact with the intermediate layer when viewing a cross section whose cutting direction is parallel to a thickness direction, and wherein at least one selected from the group consisting of FeP, $Fe_2P$, $Fe_3P$, $FeP_2$, $Fe_2P_2O_7$, (Fe,Cr)P, $(Fe,Cr)_2P$, $(Fe,Cr)_3P$, $(Fe,Cr)P_2$, and $(Fe,Cr)_2P_2O_7$ is contained as the crystalline phosphide.

2. The grain-oriented electrical steel sheet according to claim 1, wherein an average thickness of the crystalline phosphide-containing layer is 1/10 or more and 1/2 or less of an average thickness of the insulation coating when viewing the cross section.

3. The grain-oriented electrical steel sheet according to claim 1, wherein an area fraction of the crystalline phosphide in the crystalline phosphide-containing layer is 5% to 50% on average when viewing the cross section.

4. The grain-oriented electrical steel sheet according to claim 2, wherein an area fraction of the crystalline phosphide in the crystalline phosphide-containing layer is 5% to 50% on average when viewing the cross section.

5. The grain-oriented electrical steel sheet according to claim 1, wherein an equivalent circle diameter of the crystalline phosphide is 5 to 300 nm on average when viewing the cross section.

6. The grain-oriented electrical steel sheet according to claim 2, wherein an equivalent circle diameter of the crystalline phosphide is 5 to 300 nm on average when viewing the cross section.

7. The grain-oriented electrical steel sheet according to claim 3, wherein an equivalent circle diameter of the crystalline phosphide is 5 to 300 nm on average when viewing the cross section.

8. The grain-oriented electrical steel sheet according to claim 4, wherein an equivalent circle diameter of the crystalline phosphide is 5 to 300 nm on average when viewing the cross section.

9. The grain-oriented electrical steel sheet according to claim 8, wherein the crystalline phosphide contains 70% or more and 100% or less in total of Fe, Cr, P, and O, and limits Si to 10% or less, as a chemical composition.

* * * * *